(12) United States Patent
Brown

(10) Patent No.: US 10,030,683 B2
(45) Date of Patent: Jul. 24, 2018

(54) CONNECTOR

(71) Applicant: PEAK WELL SYSTEMS PTY LTD, Western Australia (AU)

(72) Inventor: Gareth Brown, Bayswater (AU)

(73) Assignee: PEAK WELL SYSTEMS PTY LTD, Bayswater (AU)

( * ) Notice: Subject to any disclaimer, the term of this patent is extended or adjusted under 35 U.S.C. 154(b) by 163 days.

(21) Appl. No.: 14/365,166

(22) PCT Filed: Dec. 13, 2012

(86) PCT No.: PCT/AU2012/001521
§ 371 (c)(1),
(2) Date: Jun. 13, 2014

(87) PCT Pub. No.: WO2013/086566
PCT Pub. Date: Jun. 20, 2013

(65) Prior Publication Data
US 2014/0314475 A1   Oct. 23, 2014

(30) Foreign Application Priority Data

Dec. 13, 2011   (AU) ................................ 2011905184

(51) Int. Cl.
*F16B 21/04*   (2006.01)
*E21B 17/02*   (2006.01)
(Continued)

(52) U.S. Cl.
CPC ............ *F16B 21/04* (2013.01); *E21B 17/021* (2013.01); *E21B 17/046* (2013.01); *F16D 1/112* (2013.01);
(Continued)

(58) Field of Classification Search
CPC ................ E21B 17/021; E21B 17/046; Y10T 403/7005; Y10T 403/7015; Y10T 403/61; Y10T 403/65; Y10T 403/655
See application file for complete search history.

(56) References Cited

U.S. PATENT DOCUMENTS 581,917 A  *  5/1897  Munz ..................... F16B 7/22
                                                   296/121
594,043 A  *  11/1897  Thompson .............. E04F 15/02
                                                   238/241
(Continued)

*Primary Examiner* — Joshua J Michener
*Assistant Examiner* — Matthew J Gitlin
(74) *Attorney, Agent, or Firm* — Nixon & Vanderhye P.C.

(57) ABSTRACT

A connector comprises a first coupling part having a flat surface with a shaft projecting therefrom; and a second coupling part having a corresponding flat surface and a hole, such that the flat surfaces may be in abutment when the shaft is inserted into the hole and the first coupling part is positioned transverse to the second coupling part. The first coupling part is movable relative to the second coupling part from a position in which the shaft is inserted into the hole to a position in which the coupling parts are held so as to be inseparable by the shaft being captured inside the hole. The first coupling part is rotatable relative to the second coupling part about the shaft when the first coupling part is in the position in which the coupling parts are held so as to be inseparable. The first coupling part and the second coupling part are provided with load transference surfaces arranged to transfer load forces between the coupling members when the first coupling part is rotated relative to the second coupling part to an engaged position.

30 Claims, 12 Drawing Sheets

(51) Int. Cl.
*E21B 17/046* (2006.01)
*F16D 1/112* (2006.01)
*F16B 21/09* (2006.01)
*F16B 7/04* (2006.01)

(52) U.S. Cl.
CPC .............. *F16B 7/042* (2013.01); *F16B 21/09* (2013.01); *Y10T 403/553* (2015.01); *Y10T 403/65* (2015.01)

(56) References Cited

U.S. PATENT DOCUMENTS

| | | | | |
|---|---|---|---|---|
| 613,663 A * | 11/1898 | Case | ............ | E04B 1/2604 16/270 |
| 730,186 A * | 6/1903 | Case | ............ | E21B 17/046 16/218 |
| 1,834,150 A * | 12/1931 | Goelz | ............ | F16G 11/10 403/353 |
| 1,883,586 A * | 10/1932 | Corrington | ............ | G01C 9/26 403/331 |
| 2,446,018 A * | 7/1948 | Miskimen | ............ | A41F 11/16 2/321 |
| 2,522,672 A * | 9/1950 | Graham | ............ | H01R 13/28 403/326 |
| 3,092,403 A * | 6/1963 | Gerdeman | ............ | F16L 15/006 285/330 |
| 4,225,265 A * | 9/1980 | Hooker | ............ | A47C 19/005 248/222.41 |
| 4,258,940 A * | 3/1981 | Fudge | ............ | F16L 37/56 285/124.1 |
| 5,007,762 A * | 4/1991 | Duran | ............ | B64G 1/645 403/171 |
| 5,188,539 A * | 2/1993 | Langdon | ............ | G02B 6/3817 385/53 |
| 5,588,771 A * | 12/1996 | Scott | ............ | E21B 17/04 403/102 |
| 5,607,250 A * | 3/1997 | Tatterson | ............ | E21B 17/046 166/377 |
| 5,836,061 A * | 11/1998 | Castillo | ............ | F16C 1/14 24/115 R |
| 2010/0196089 A1* | 8/2010 | Puttmann | ............ | E21B 17/046 403/294 |

* cited by examiner

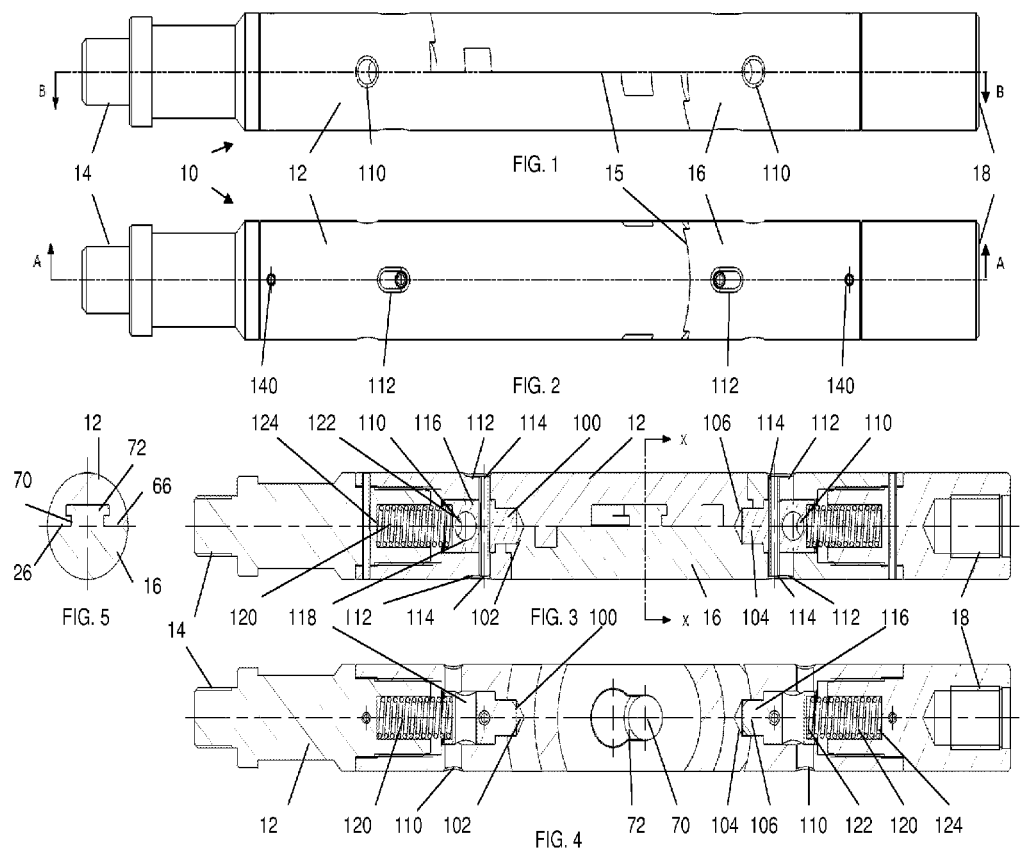

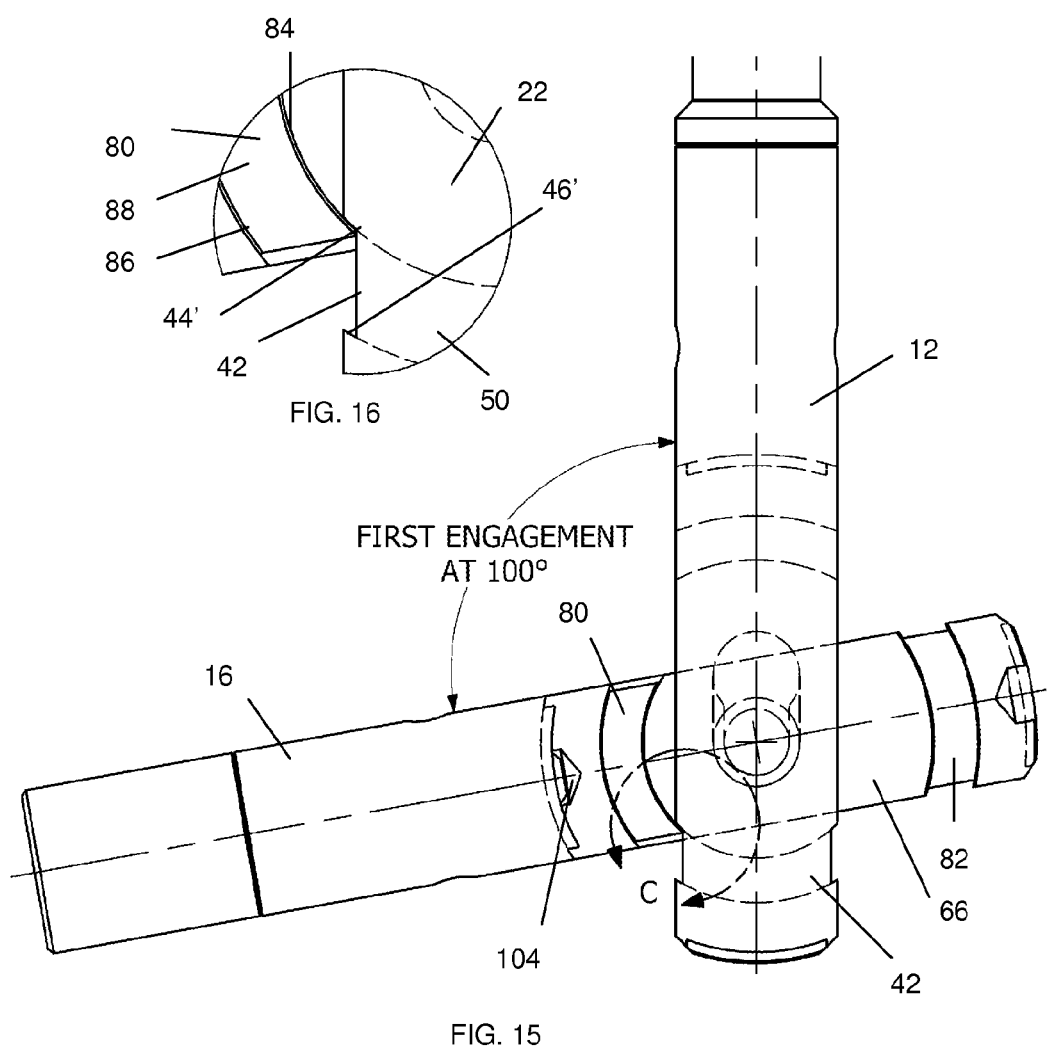

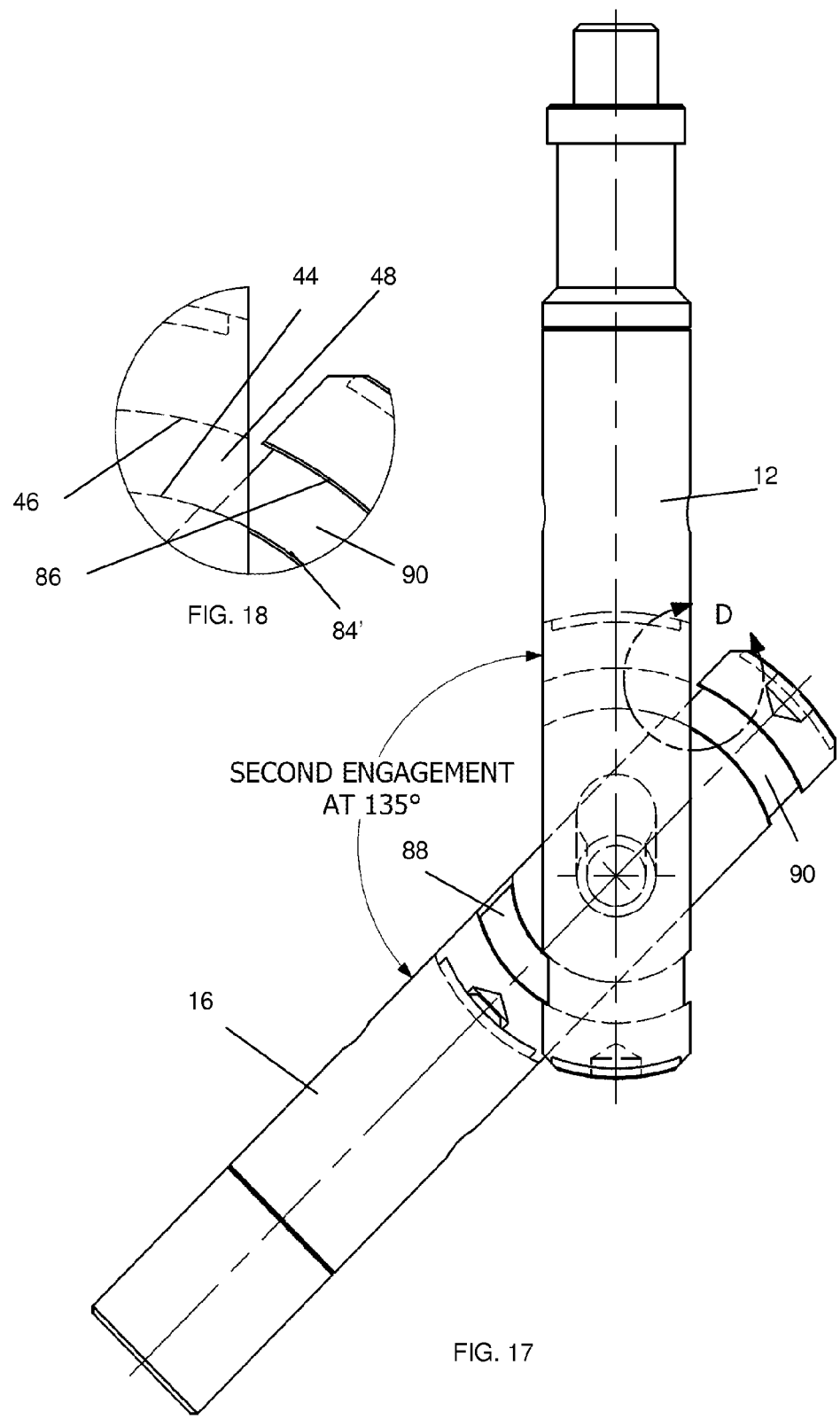

CONNECTOR

This application is the U.S. national phase of International Application No. PCT/AU2012/001521 filed 13 Dec. 2012 which designated the U.S. and claims priority to AU Patent Application No. 2011905184 filed 13 Dec. 2011, the entire contents of each of which are hereby incorporated by reference.

FIELD OF THE INVENTION

The present invention relates to a connector suitable for connecting a string of components together.

BACKGROUND

In the oil and gas industry strings of tools are lowered down a well. It is convenient to be able to quickly connect and disconnect various tools to a tool string for hoisting or lowering into a bore hole casing of a well.

U.S. Pat. No. 5,052,849 and WO 2005/085583 describe "quick-locking" connectors, however both of these connectors have limitations. Reference to these documents is not an admission that they form part of the common general knowledge of a skilled person in any jurisdiction.

The present invention is an alternative to these connectors.

SUMMARY OF THE PRESENT INVENTION

According to one aspect of the present invention there is provided a connector comprising:

a first coupling part having a flat surface with a shaft projecting therefrom;

a second coupling part having a corresponding flat surface and a hole, such that the flat surfaces may be in abutment when the shaft is inserted into the hole and the first coupling part is positioned transverse to the second coupling part;

wherein the first coupling part is movable relative to the second coupling part from a position in which the shaft is inserted into the hole to a position in which the coupling parts are held so as to be inseparable by the shaft being captured inside the hole;

wherein the first coupling part is rotatable relative to the second coupling part about the shaft when the first coupling part is in the position in which the coupling parts are held so as to be inseparable;

wherein the first coupling part and the second coupling part are provided with load transference surfaces arranged to transfer load forces between the coupling members when the first coupling part is rotated relative to the second coupling part to an engaged position.

In an embodiment the flat surfaces are complimentary abutment surfaces.

In an embodiment the shaft is part of a key projecting from the flat surface of the first coupling part.

In an embodiment the hole is part of a keyway in the flat surface of the second coupling part.

In an embodiment the first coupling part is slidable within the elongate hole when the shaft is inserted in the hole.

In an embodiment rotation of the first coupling part relative to the second coupling part to the engaged position is not possible unless the first coupling part has moved to the portion in which the coupling parts are held inseparable.

In an embodiment rotation of the first coupling part relative to the second coupling part is not possible unless the first coupling part has moved to the portion in which the coupling parts are held inseparable.

In an embodiment the movement of the first coupling part relative to the second coupling part to the position in which the coupling parts are held so as to be inseparable occurs under gravity when the second coupling part is in a vertical orientation.

In an embodiment the movement of the first coupling part relative to the second coupling part to a position in which the shaft can be removed from the hole is against gravity when the second coupling part is in a vertical orientation.

In an embodiment the first coupling part and the second coupling part are provided with a plurality of load transference surfaces on either side of the shaft and hole respectively arranged to transfer load forces between the coupling members.

In an embodiment one of the load transference surfaces on each side of the shaft and hole are radially directed and one is axially directed.

In an embodiment the each of the plurality of load transference surfaces come into engagement separately as the first coupling part is rotated relative to the second coupling part.

In an embodiment the connector comprises a locking means for locking the coupling parts in the engaged position.

According to another aspect of the present invention there is provided a connector comprising:

a first coupling part having a first abutment surface, a key with a flanged head projecting from the first abutment surface and a first load transference surface on the first abutment surface spaced from the key;

a second coupling part having a second abutment surface for abutting the first abutment surface, a keyway in the second abutment surface for receiving the flanged head of the key when the first coupling part is transverse the second coupling part and a slot with a smaller opening than the keyway in one dimension extending from the keyway into which the received flanged head can move to a rotation position within the slot whilst capturing the flanged head inside the slot, and a second load transference surface spaced from the rotation position by the same distance as the first abutment surface is spaced from the key;

wherein the rotation position is spaced from a position at which the key is received in the keyway;

wherein the abutment faces are prevented from separating and first coupling member is rotatable to an engagement position when the abutment faces are abutted, the key is inserted into the keyway and the key is moved to the rotation position;

wherein the load transference surfaces are arranged to transfer a force between the coupling parts when the first coupling part is rotated relative to the second coupling part to the engagement position such that the load transference surfaces are in abutment.

In an embodiment the first coupling part is elongate with an end connector at one end and the first abutment surface extending along the first coupling part from an opposite end.

In an embodiment the first abutment surface is disposed on a semi-circular cross-sectional portion.

In an embodiment the key projects orthogonally from the first abutment surface. In an embodiment the key comprises a shaft projecting from the first abutment surface. In an embodiment the flanged head comprises a circular flange at the end of the shaft. In an embodiment the flanged head comprises a lug projecting radially from the shaft. In an embodiment the flanged head comprises a pair of lugs projecting radially from opposite sides of the shaft. In an embodiment the flanged head comprises a plurality of lugs projecting radially from the shaft.

In an embodiment the first load transference surface is curved about a central axis of the key. In an embodiment the first load transference surface defines a curved tongue. In an embodiment the first load transference surface defines a curved groove. In an embodiment the first load transference surface defines a curved tongue and groove.

In an embodiment the second coupling part is elongate with an end connector at one end and the second abutment surface extends along the second coupling part from an opposite end. In an embodiment the second abutment surface is disposed on a semi-circular cross-sectional portion.

In an embodiment the semi-circular cross-sectional portions of the first and second coupling parts form a cylindrical shape when the abutment surfaces are abutted and the first coupling part is in the engagement position.

In an embodiment the keyway extends into the semi-circular cross-sectional portion. In an embodiment the keyway forms a pocket into which the key may move and when so positioned the abutment faces are prevented from separating. In an embodiment the keyway is an aperture shaped to receive the head and the slot has a restricted opening small enough to capture the head. In an embodiment the slot comprises a chamber into which the head of the key is received whilst a shaft of the key passes through the restricted opening.

In an embodiment the pocket is elongate and runs axially relative to the second coupling part.

In an embodiment the pocket is arrange so that the key is able to enter the pocket under gravity when the second coupling part is oriented to be vertical and the one end of the second coupling part is above the opposition end.

In an embodiment the parts are arranged such that the flanged head is able to move to the rotation position under the influence of gravity. In an embodiment the parts are arranged such that the second coupling part is able to move to the engagement position under the influence of gravity.

In an embodiment the pocket is arrange so that the key is only able to be removed from the pocket against gravity when the second coupling part is oriented to be vertical and the one end of the second coupling part is above the opposition end.

In an embodiment the parts are arranged such that the second coupling part is only able to move from the engagement position to the rotation position against the influence of gravity. In an embodiment the parts are arranged such that the flanged head is only able to move from the rotation position to a position at which the parts may be separated against the influence of gravity.

In an embodiment the slot has the smaller opening than the keyway in a dimension transverse to the length of the second coupling part.

In an embodiment the rotation position and the central axis of the key are aligned when the key is moved to the rotation position.

In an embodiment the rotation position is spaced form the central axis of the key when the key is inserted into the keyway without moving the key to the rotation position.

In an embodiment the second load transference surface is curved about the rotation position. In an embodiment the second load transference surface defines a curved groove when the first load transference surface is a tongue and the groove receives the tongue when the first coupling part is in the engagement position. In an embodiment the second load transference surface defines a curved tongue when the first load transference surface is a groove and the groove receives the tongue when the first coupling part is in the engagement position. In an embodiment the second load transference surface defines a curved tongue and groove complementary to the tongue and groove of the first load transference surface and each groove receives each complementary tongue when the first coupling part is in the engagement position.

In an embodiment one or both of the load transference surfaces of the first coupling part and the second coupling part are positioned to prevent rotation of the first coupling part relative the second coupling part in to the engaged position unless the first coupling part is first in the rotation position.

In an embodiment the force is one or more of a thrust force, tension force, a compressive force, a torque force, and a longitudinal deflection force.

In an embodiment the first coupling part comprises an undercut for receiving an axial end of the second coupling part when the second coupling part is in the engagement position. In an embodiment the second coupling part comprises an undercut for receiving an axial end of the first coupling part when the second coupling part is in the engagement position.

In an embodiment the first coupling part comprises a locking means for locking the second part in the engagement position. In an embodiment the second coupling part comprises a locking means for locking the second part in the engagement position relative to the first coupling part. In an embodiment the locking means of each part comprises a releasable pin and socket. In an embodiment the locking means of the first part is releasable by application of a force in one direction and the locking means of the second part is releasable by application of a force in an opposite direction.

In an embodiment the load transference surfaces are configured to commence engagement upon a small rotation of the first coupling part relative to the second coupling part and prior to the parts being aligned. In an embodiment the load transference surfaces are configured to prevent return movement of the first coupling part relative to the second coupling part to a position in which the coupling parts are separable when the load transference surfaces are engaged.

In an embodiment the load transference surfaces are configured to progressively engage with rotation of the first coupling part relative to the second coupling part.

According to another aspect of the present invention there is provided a connector comprising:

a first coupling part having a flat surface;

a second coupling part having corresponding flat surface such that the flat surfaces may be in abutment;

characterised in that the first coupling part comprises a shaft projecting from the flat surface;

the second coupling part comprises a hole in the corresponding flat surface, such that the shaft is able to be inserted into the hole when the flat surfaces are in abutment and the first coupling part is positioned transverse to the second coupling part;

wherein the first coupling part is movable relative to the second coupling part from a position in which the shaft is inserted into the hole to a position in which the coupling parts are held so as to be inseparable by the shaft being captured inside the hole;

wherein the first coupling part is rotatable relative to the second coupling part about the shaft when the first coupling part is in the position at which the coupling parts are inseparable;

wherein the first coupling part and the second coupling part are provided with load transference surfaces arranged to transfer loading between the coupling members when the first coupling part is rotated relative to the second coupling part to an engaged position.

According to an aspect of the present invention there is provided a down hole tool comprising a connector as defined by one of the aspects above.

According to one aspect of the present invention there is provided a method of forming a connection between a first component and a second component, said method comprising:

coupling a first coupling part of a connector to the first component;

coupling a second coupling part of the connector to the second component;

positioning the first coupling part transverse to the second coupling part;

inserting a shaft projecting from a flat surface of the first part into a hole in a complementary flat surface of the second part so that the flat surfaces are in abutment; moving the first coupling part relative to the second coupling part so that the coupling parts are inseparable;

rotating the first coupling part relative to the second coupling part such that the parts are aligned and such that load transference surfaces of each part are engaged to transfer loading between the coupling members.

In an embodiment moving the first coupling part relative to the second coupling part so that the coupling parts are inseparable comprises sliding the shaft of the first part into a restricted opening channel extending from the hole such that the shaft may not be directly withdrawn.

In an embodiment moving the first coupling part relative to the second coupling part so that the coupling parts are inseparable comprises moving the first coupling part relative to the second coupling part so that the first coupling part is rotatable relative to the second coupling part.

In an embodiment rotating the first coupling part relative to the second coupling part causes engagement of the load transference surfaces prior to the parts being aligned.

In an embodiment engagement of the load transference surfaces prevents return movement of the first coupling part relative to the second coupling part to a position in which the coupling parts are separable.

In an embodiment disengagement of the first coupling part and the second coupling part comprises rotating the first coupling part relative to the second coupling part to the rotation position such that the load transference surfaces disengage, moving the first coupling part relative to the second coupling part to a position in which the coupling parts are separable, and removing the shaft from the hole so as to decouple the parts.

Also according to the present invention there is provided a connector comprising:

a first coupling part having a flat surface with a shaft projecting therefrom configured to correspond to a second coupling part with a corresponding flat surface and a hole, such that the flat surfaces may be in abutment when the shaft is inserted into the hole and the first coupling part is positioned transverse to the second coupling part;

wherein the first coupling part is configured so as be movable relative to the second coupling part from a position in which the shaft is inserted into the hole to a position in which the coupling parts are held so as to be inseparable by the shaft being captured inside the hole;

wherein the first coupling part is configured to be rotatable relative to the second coupling part about the shaft when the first coupling part is in the position in which the coupling parts are held so as to be inseparable;

wherein the first coupling part is provided with load transference surfaces arranged to transfer load forces between the coupling members when the first coupling part is rotated relative to the second coupling part to an engaged position.

Also according to the present invention there is provided a connector comprising:

a coupling part having a flat surface and a hole therein, such that a corresponding flat surface of another coupling part with a shaft projecting therefrom surfaces may be in abutment when the shaft is inserted into the hole and the other coupling part is positioned transverse to the coupling part;

wherein the coupling part is allow the other coupling part to be relatively movable from a position in which the shaft is inserted into the hole to a position in which the coupling parts are held so as to be inseparable by the shaft being captured inside the hole;

wherein the coupling part is configured so that the other coupling part is relatively rotatable about the shaft when the first coupling part is in the position in which the coupling parts are held so as to be inseparable;

wherein the coupling part is provided with load transference surfaces arranged to transfer load forces between the coupling members when the other coupling part is rotated relative to the coupling part to an engaged position.

In this specification the terms "comprising" or "comprises" are used inclusively and not exclusively or exhaustively.

DESCRIPTION OF DRAWINGS

In order to provide a better understanding of the present invention preferred embodiments will now be described, by way of example only, with reference to the accompanying drawings, in which:

FIG. 1 is a side elevation of an embodiment of a connector according to the present invention;

FIG. 2 is a bottom view of the connector of FIG. 1;

FIG. 3 is a cross-sectional elevation through the section A-A of the connector of FIG. 2;

FIG. 4 is a cross-sectional plan view through the section B-B of the connect or FIG. 1;

FIG. 5 is a cross-sectional end elevation through the section X-X of FIG. 3;

FIG. 15 is a plan view of the first and second parts of FIG. 12 joined in a third stage of mating;

FIG. 16 is an enlarged view of the portion C of FIG. 15;

FIG. 17 is a plan view of the first and second parts of FIG. 15 joined in a fourth stage of mating;

FIG. 18 is an enlarged view of the portion D of FIG. 17;

DESCRIPTION OF EMBODIMENTS OF THE INVENTION

Figure 6:
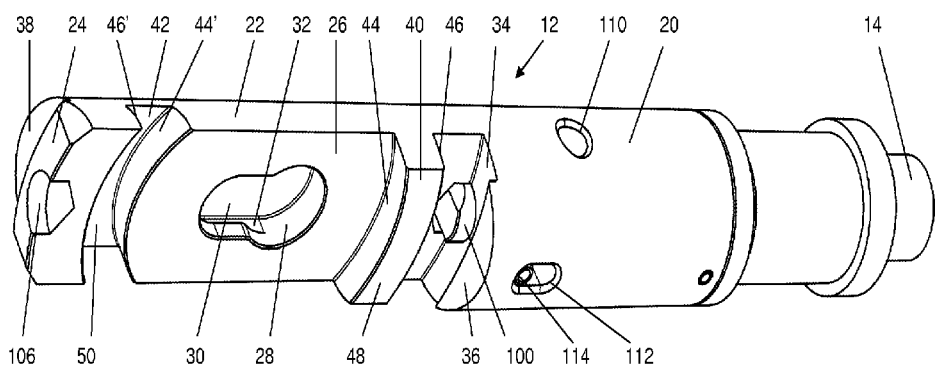
FIG. 6 is a perspective view of a first part of the connector of FIG. 1.
Figure 7:
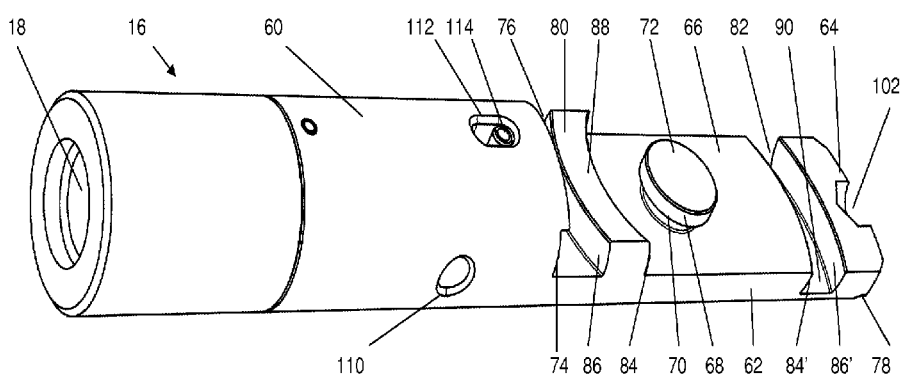
FIG. 7 is a perspective view of a second part of the connector of FIG. 1.

Referring to FIGS. 1 to 5, there is a connector 10 comprising a first coupling part 12 and a second coupling part 16. The first and second coupling parts 12 and 16 meet at interface 15 and are coupled together when in the shown configuration. First part 12 has an interface, in this embodiment in the form of a threaded stub 14 for connection to another device. In an alternative the interface could be in the form of an eyelet to which a cable may be hooked, for example. Second part 16 has an interface, in this embodiment in the form of a tube with a threaded hole 18 for connection to another device. In an alternative the interface could also be in the form of an eyelet to which a cable may be hooked, for example. In the embodiment shown the connector 10 may be in the form of a member of a string of components used in a well borehole. The connector 10 may form part of a down hole tool. In typical operation stub 14 will be suspended with the rest of the connector 10 being beneath the stub 14.

Parts 12 and 16 are generally elongate and each has a body portion 20 and 60 respectively and opposite the respective interfaces 14 and 18 there is a respective coupling portion 22 and 62 extending from the respective body portion 20 and 60. In this embodiment the body portions 20 and 60 are cylindrical is shape, with substantially the same diameter. In this embodiment the coupling portions 22 and 62 are each generally semi-cylindrical in shape, with the semi-cylinders being complementary, so that when mated such that surfaces 26 and 66 are generally parallel and in contact, the coupling portions 22 and 62 together form a cylindrical shape, of substantially the same diameter as the body portions 20 and 60. Thus as seen from FIGS. 1 and 2, when coupled (fully mated) the connector 10 appears to be a generally continuous cylinder. This is particularly useful when the connector is employed within a borehole, as the borehole casing is typically cylindrical and the connector need only be marginally narrower than the inner diameter of the borehole casing. The mating process has a number of stages, which will be described further below.

The first coupling part 12 is described in more detail with reference to FIGS. 3 to 6. The coupling portion 22 comprises an end surface 24 opposite the threaded stub 14, an abutment surface 26, a mating feature for mating with the coupling portion 62 and load or force transfer elements that transmit forces between the coupling parts 12 and 16. Surface 26 is substantially planar and extends axially in one dimension and across the diameter of the semi-cylindrical coupling portion 22 in the other dimension. In this embodiment the mating feature comprises a keyway 28 in the surface 26 that comprises an opening in the surface 26 and a slot 30. The slot 30 provides a longitudinally extending open channel 32 with a restriction to the opening of the channel 32 that is narrower than the opening to the keyway 28 in the dimension orthogonal to the length of the part 12. In an embodiment the keyway forms a pocket that extends towards end surface 24.

The force transfer elements comprise a tongue 40 projecting from the surface 26 and a groove 42 in the surface 26. Tongue 40 is curved and has a radius of curvature about a rotation point in the plane of the surface 26. The point of rotation is in the middle of slot 30 and will be described further below. The tongue 40 has a wall 44 closer to the rotation point and a wall 46 further from the rotation point. Tongue 40 also has an abutment surface 48 at the top of the tongue 40 extending between the tongue's walls 44 and 46 which is substantially parallel to the surface 26. Groove 42 is curved and has a different radius of curvature about the rotation point. In this embodiment the radius of curvature of the groove 42 is shorter than the radius of curvature of the tongue 40. The groove 42 has a wall 44' closer to the rotation point and a wall 46' further from the rotation point. Groove 42 also has an abutment surface 50 at the bottom of the groove 40 extending between the groove's walls 44' and 46' which is substantially parallel to the surface 26.

The end surface 24 is curved with a radius of curvature about the rotation point. Stepped inwardly from the surface 24 is a secondary end surface 38 that is also curved with a radius of curvature about the rotation point. The radius of curvature of surface 38 is slightly smaller than the radius of curvature of surface 24 such that the axial end of part 12 juts out.

The interface between the cylindrical body portion 20 and the semi-cylindrical coupling portion 22 is defined by walls 34 and 36. There is a step between the walls 34 and 36 such that the step and wall 34 define an undercut. Wall 36 is inward from wall 34 with respect to the point of rotation. Walls 34 and 36 are curved with each having a different radius of curvature about the rotation point. The radius of curvature of wall 36 is slightly smaller than the radius of curvature of wall 34. In this embodiment the radius of curvature of surface 24 is the same as the radius of curvature of wall 34. The radius of curvature of surface 38 is the same as the radius of curvature of wall 36.

In the embodiment shown, projecting in from the wall 34 and having a displacement outwardly from the surface 26 is a head 100 of a pin 116. Indenting from the surface 24 and an adjacent portion of the surface 26 is a notch 106.

Within the body portion 20 is a hole 110, which extends through the diameter of the body portion 20 and parallel to the surface 26. Within the body portion 20 is an elongated hole 112, which extends through the diameter of the body portion 20 and perpendicular to the surface 26. Within the hole 112 is a roll pin 114, which is internally connected to the pin 116. Moving the roll pin 114 away from end surface 24 moves the pin 116 so as to withdraw the head 100. Pin 116 has a hole 118 there through. When head 100 is withdrawn the hole 118 aligns with the hole 110. A pin (not shown) can thus be inserted in hole 110 to pass through hole 118 to hold the head 100 in the withdrawn position. Pin 116 has an end 122 opposite head 100. Internal to the body portion 20 is a bearing surface 124. Between end 122 and surface 124 is a spring means 120, such as a coil spring, which urges the pin 116 to move so as to cause the head 100 to project from wall 34. In an alternative to hole 118 the pin 116 may have a narrow neck that can be engaged to move the pin 116 such that the head 100 is withdrawn.

The second coupling part 16 is described in more detail with reference to FIGS. 3 to 5 and 7. The coupling portion 62 comprises an end surface 64 opposite the threaded hole 18, an interface surface 66, a mating feature for mating with the coupling portion 22 and load or force transfer elements that transmit forces between the coupling parts 12 and 16. Surface 66 is substantially planar and extends axially in one dimension and across the diameter of the semi-cylindrical coupling portion 62 in the other dimension. In this embodiment the mating feature comprises a key 68 projecting from the surface 66 that comprises a shaft or post 70 and a circular flanged head 72. The head 72 is sized to fit through the hole 28 of the keyway. Further the head 72 is sized to slide into the pocket and within the channel 32 with the post 70 fitting through the opening in the channel 30, but the head 72 is captured within the restricted opening of the channel 32.

In an alternative the mating features may be a lug or other flange. In one form there may be a pair of opposed lugs that align with the keyway 28 when the second part 16 is transverse the first part 12, but are transverse the keyway 28 opening, and thus held in the keyway 28, when the first part is rotated relative to the second part in the third mating stage as described below.

The force transfer elements comprise a tongue 80 projecting from the surface 66 and a groove 82 in the surface 66. Tongue 80 is curved and has a radius of curvature about a rotation point. The point of rotation is at the centre of post 70. When in a second stage of mating as described below the rotation point of the portion 16 will coincide with the rotation point of the portion 12. The tongue 80 has a wall 84 closer to the rotation point and a wall 86 further from the rotation point. Tongue 80 also has an abutment surface 88 at the top of the tongue extending between the tongue's walls 84 and 86 which is substantially parallel to the surface 66. Groove 82 is curved and has a different radius of curvature about the rotation point. In this embodiment the radius of curvature of the tongue 80 is shorter than the radius of curvature of the groove 82. The groove 82 has a wall 84' closer to the rotation point and a wall 86' further from the rotation point. Groove 82 also has an abutment surface 90 at the bottom of the groove extending between the groove's walls 84' and 86' which is substantially parallel to the surface 66.

The end surface 64 is curved with a radius of curvature about the rotation point. Stepped inwardly from the surface 64 is a secondary end surface 78 that is also curved with a radius of curvature about the rotation point. The radius of curvature of surface 78 is slightly smaller than the radius of curvature of surface 64 such that the axial end of the part 16 juts out.

The interface between the cylindrical body portion 60 and the semi-cylindrical coupling portion 62 is defined by walls 74 and 76. There is a step between the walls 74 and 76 such that the step and wall 74 define an undercut. Wall 76 is inward from wall 74 with respect to the point of rotation. Walls 74 and 76 are curved with each having a different radius of curvature about the rotation point. The radius of curvature of wall 76 is slightly smaller than the radius of curvature of wall 74. In this embodiment the radius of curvature of surface 64 is the same as the radius of curvature of wall 74. The radius of curvature of surface 78 is the same as the radius of curvature of wall 76.

In an embodiment projecting in from the wall 74 and having a displacement outwardly from the surface 66 is a head 104 of a pin 116'. Indenting from the surface 64 and an adjacent portion of the surface 66 is a notch 102.

Within the body portion 22 is another hole 110', which extends through the diameter of the body portion 22 and parallel to the surface 66. Within the body portion 60 is another elongated hole 112', which extends through the diameter of the body portion 60 and perpendicular to the surface 66. Within the hole 112 is another roll pin 114', which is internally connected to the pin 116'. Moving the roll pin 114' away from end surface 64 moves the pin 116' so as to withdraw the head 104. Pin 116' has a hole 118' there through, which when head 104' is withdrawn aligns with the hole 110'. A pin (not shown) can thus be inserted in hole 110' to pass through hole 118' to hold the head 104 in the withdrawn position. Pin 116' also has an end 122 opposite head 104. Internally to the body portion 60 is a bearing surface 124. Between end 122 and surface 124 is another spring means 120, such as a coil spring, which urges the pin 116' to move so as to cause the head 104 to project from wall 74. In an alternative to hole 118' the pin 116' may have a narrow neck that can be engaged to move the pin 116' such that the head 104 is withdrawn.

In an embodiment the radius of curvature of the surface 24 is the same as the radius of curvature of the wall 74. The radius of curvature of the surface 38 is the same as the radius of curvature of the wall 76. The radius of curvature of the surface 64 is the same as the radius of curvature of the wall 34. The radius of curvature of the surface 78 is the same as the radius of curvature of the wall 36.

In another embodiment the pin 116 and the remainder of this locking mechanism is omitted, although the pin 116' and its locking mechanism remains. In a further alternative pin 116' and its locking system may be omitted while 116 and its locking mechanism remains.

Figure 8:
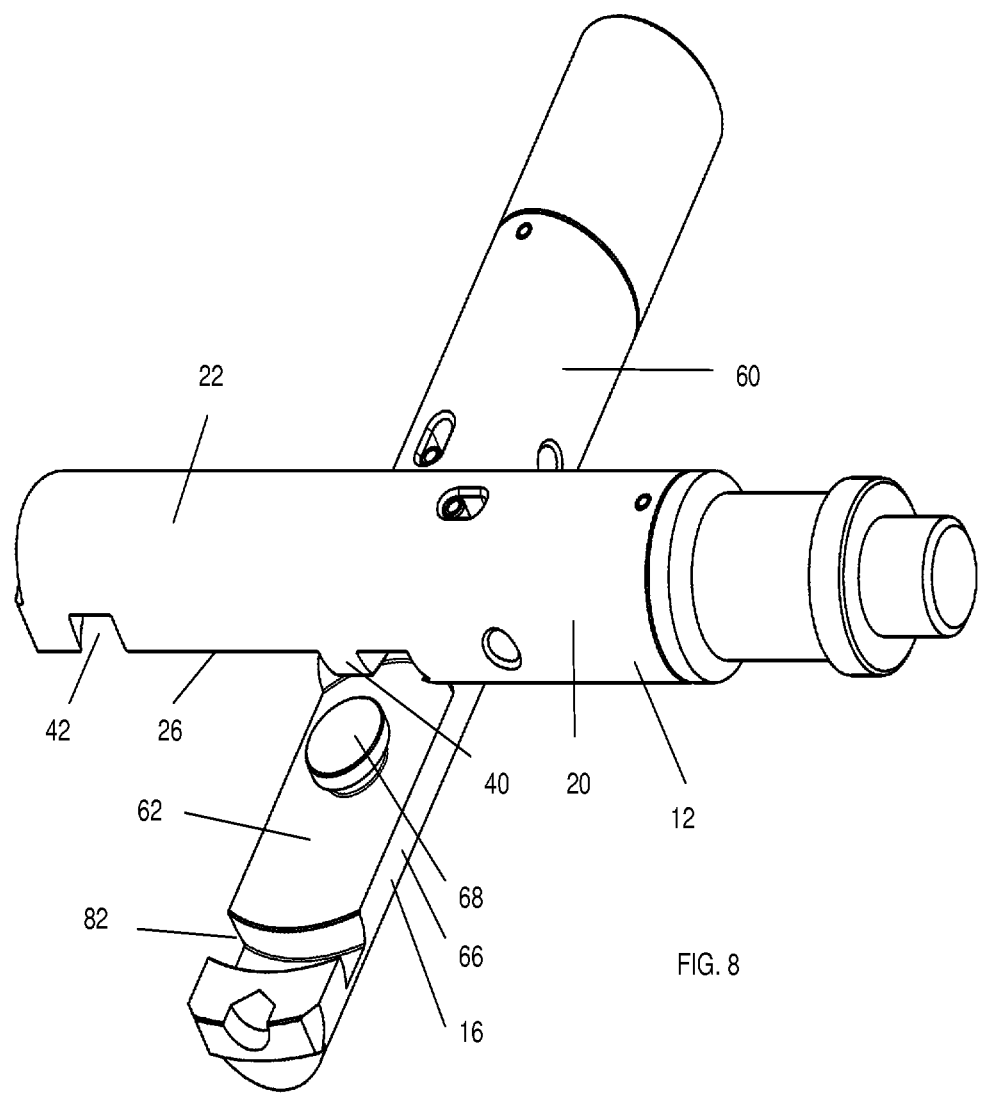
FIG. 8 is a perspective view of the first and second parts of FIGS. 6 and 7 arranged for joining.

Referring now to FIG. 8, the coupling parts 12 and 16 are positioned for coupling together. The axes of the parts 12 and 16 are transverse, and in this embodiment generally perpendicular although there is a degree of tolerance such that they do not need to be at exactly 90 degrees to each other. The tongues 40 and 80 provide guides to ensure the parts 12 and 16 are at acceptable angles with respect to each other. Specifically in this embodiment the tongues 40 and 80 will be in the way if the parts 12 and 16 are not correctly positioned to commence coupling. In a preferred embodiment it is preferred that the parts be at or close to perpendicular, and thus the walls 44 and 84 of the tongues 40 and 80 have a radius of curvature of slightly more than the radius of the semi-cylindrical portions 22 and 62. The surfaces 26 and 66 are generally parallel to each other. The key 68 is positioned to be inserted into the keyway 28. While not shown, in one embodiment the pins would usually be in holes 110 and 110' to keep the heads 100 and 104 withdrawn. Generally in use the part 12 will be hanging from a tower, crane or otherwise suspended and oriented vertically. The part 16 will generally be attached to a tool or other object to be lowered into say a borehole and will thus be generally oriented horizontally.

Figure 9:
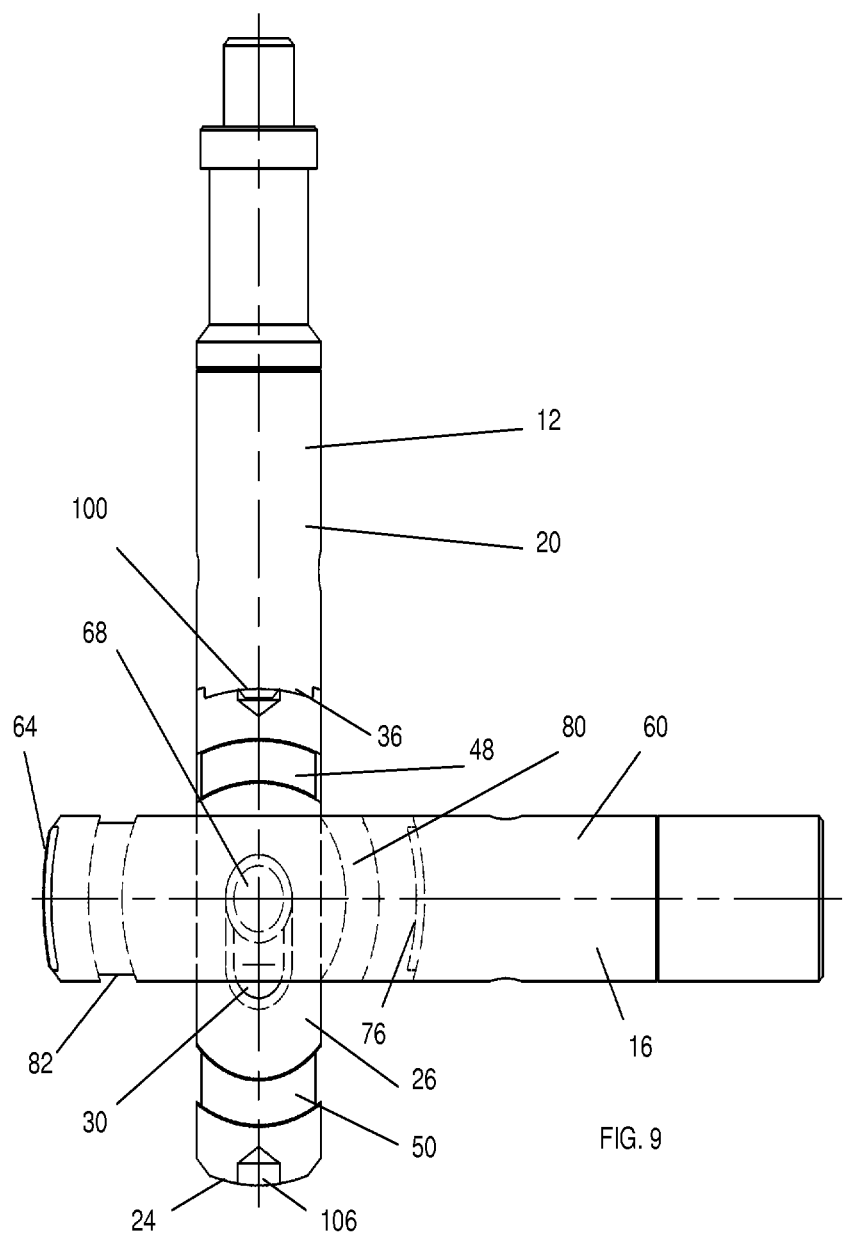
FIG. 9 is a plan view of the first and second parts of FIGS. 6 and 7 joined in a first stage of mating.
Figure 10:
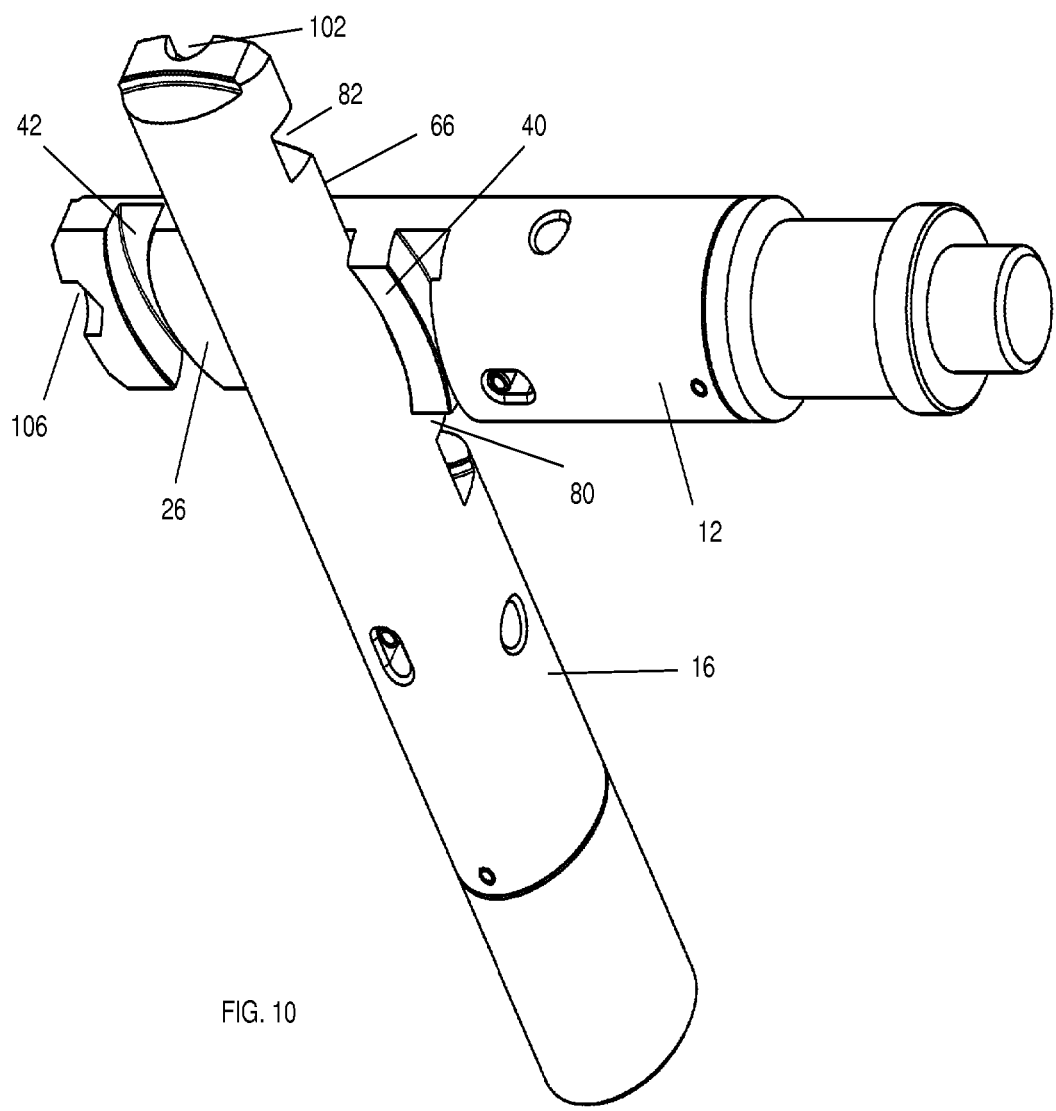
FIG. 10 is a perspective view of the first and second parts joined in the first stage of FIG. 9.
Figure 11:
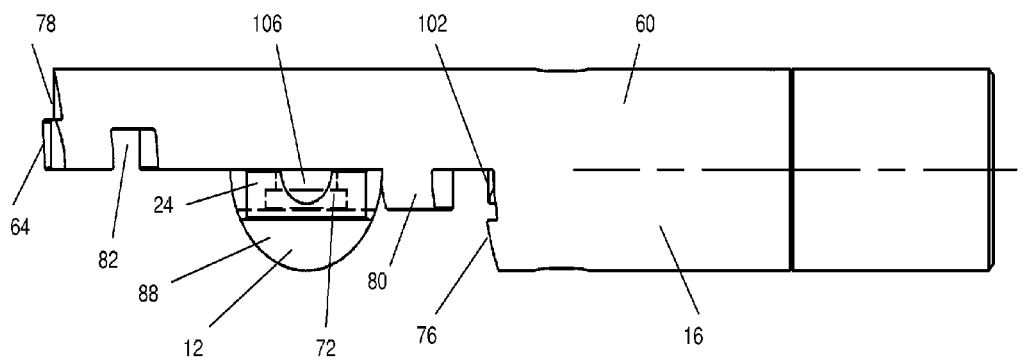
FIG. 11 is a side view of the first and second parts joined in the first stage of FIG. 9.

FIGS. 9 to 11 show the parts 12 and 16 have been brought together such that the surfaces 26 and 66 are in contact, and the key 68 is inserted into the keyway 28. This is the first mating stage. If necessary the key 68 can be removed from the keyway 28 provided that the key 68 have not been slid into the channel 32.

Figure 12:
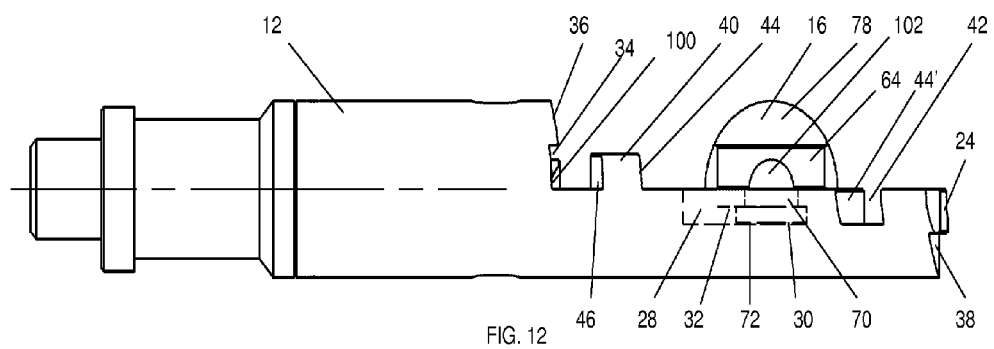
FIG. 12 is a side view of the first and second parts stage of FIG. 9 joined in a second stage of mating.
Figure 13:
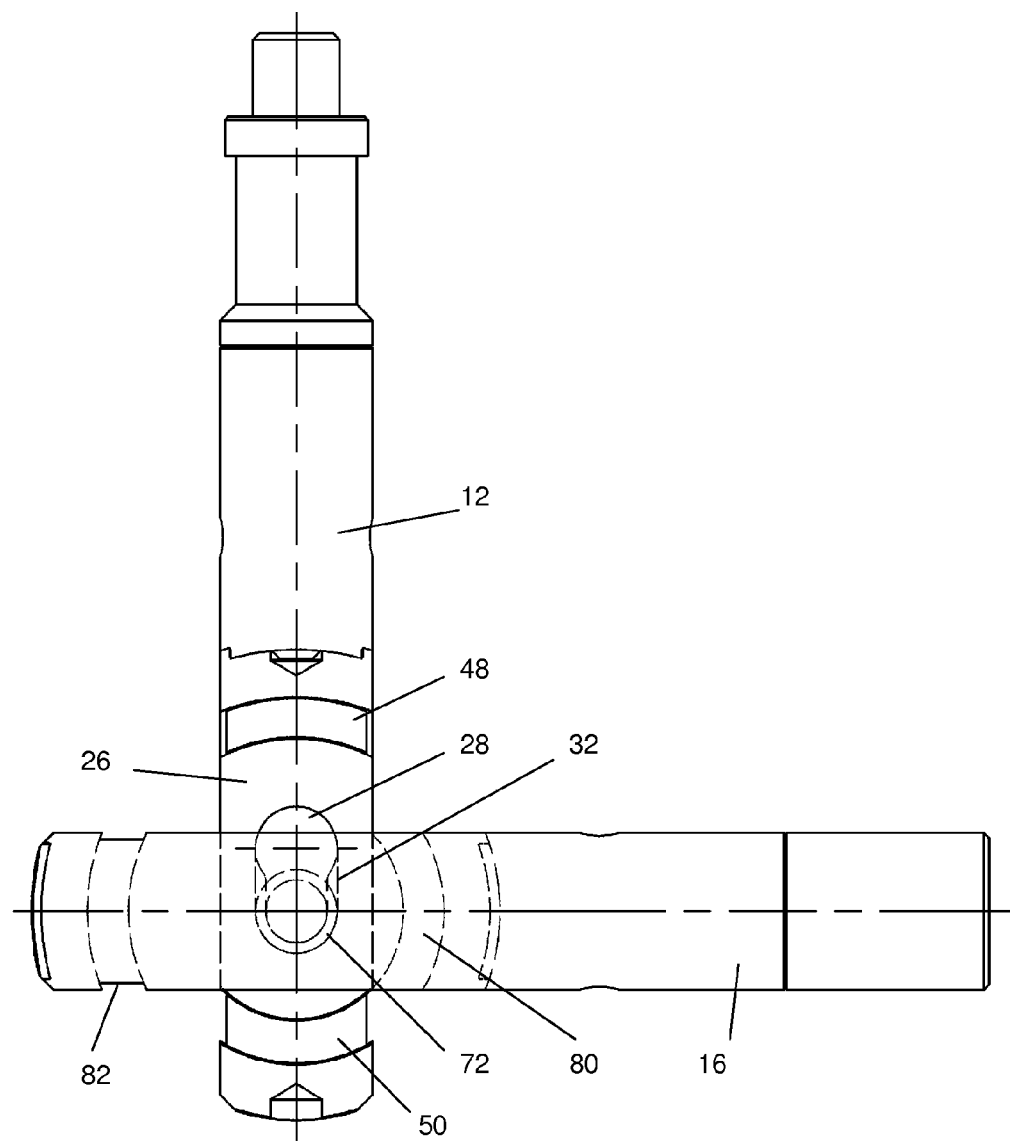
FIG. 13 is a plan view of the first and second parts joined in the first stage of FIG. 12.
Figure 14:
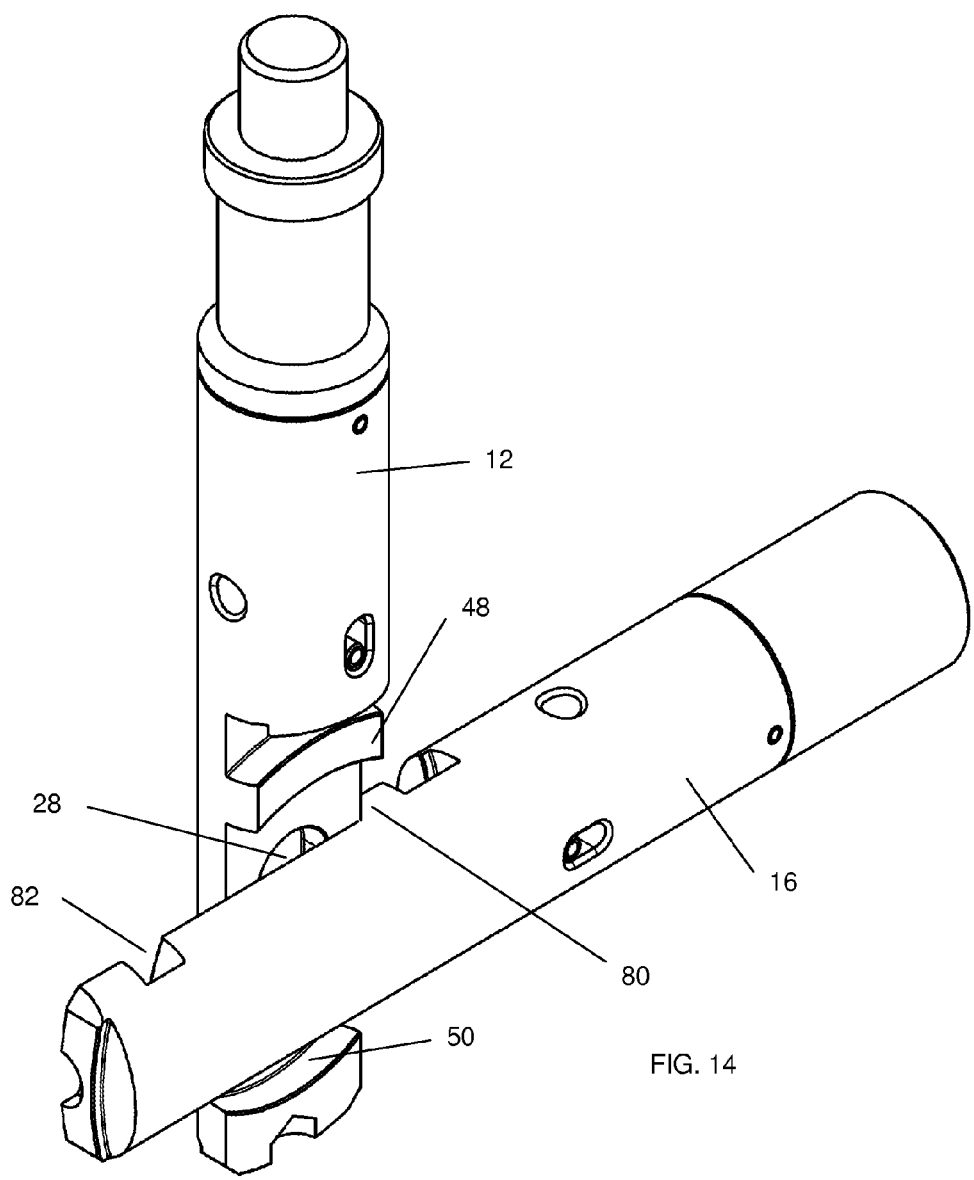
FIG. 14 is a perspective view of the first and second parts joined in the second stage of FIG. 12.

FIGS. 12 to 14 show the second mating stage. This is where the key 68 is slid into the channel 32. Thus the part 16 moves towards the end surface 24 of part 12. At this stage the points of rotation of each part 12 and 16 will coincide. Typically the part 16 will move under the influence of gravity to the second mating stage. The parts 12 and 16 are now in a rotation position in which they can be rotated about the points of rotation. The points of rotation define an axis of rotation. In one embodiment the tongues 40 and 80 will prevent full rotation of the parts to the engagement position if the part 16 is not first moved to the rotation position.

While the key 68 is within the channel 32 but not in the opening of the keyway 28, the key 68 is not able to be removed form the keyway 28.

FIGS. 15 and 16 show a third stage of mating. This is where the second part is rotated about the points of rotation such that tongue 80 begins to enter groove 42. Typically the part 16 will rotate under the influence of gravity to the third mating stage. Due the radii of curvatures of the walls of the tongue 80 and groove 42, the tongue 80 will snugly fit within the groove 42 such that the walls will abut so as to enable transfer of forces between the parts 12 and 16. As seen in more detail in FIG. 16 wall 84 comes into abutment with wall 44' and surface 88 will come into abutment with surface 50. In the Figure this occurs at about and angle of 100 degrees between the parts 12 and 16, however this can occur at a different angle. In one preferred form this angle is between 95 and 110 degrees. As rotation continues wall 86 will come into abutment with wall 46'. While wall 84 is in abutment with wall 44' part 16 will be prevented from moving relative to part 12 in a manner that moves the key 68 within the channel 32 such that the key 68 could be removed form the keyway 28.

FIGS. 17 to 18 show a fourth stage of mating. This is where the second part is rotated about the points of rotation such that tongue 40 begins to enter groove 82. Again due the radii of curvatures of the walls of the tongue 40 and groove 82, the tongue 40 will snugly fit within the groove 82 such that the walls with abut so as to enable transfer of forces between the parts 12 and 16. As seen in more detail in FIG. 18 wall 44 comes into abutment with wall 84' and surface 48 will come into abutment with surface 90. In the Figure this occurs at about an angle of 135 degrees between the parts 12 and 16, however this can occur at a different angle. In one preferred form this angle is between 120 and 150 degrees. As rotation continues wall 46 will come into abutment with wall 86'. The tongue 80 and groove 42 also prevents the key 68 from jumping out of the keyway 28.

Figure 19:
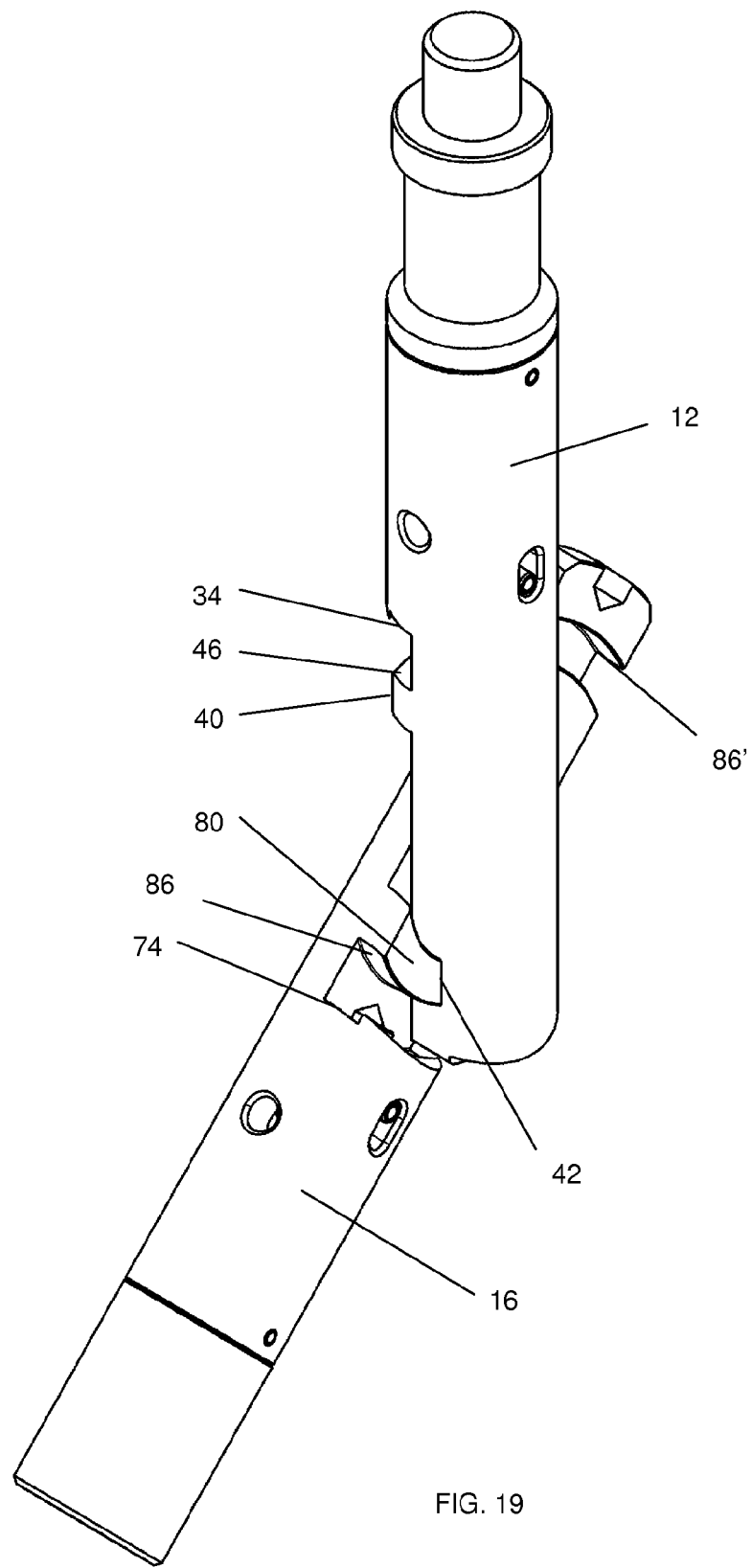
FIG. 19 is a perspective view of the first and second parts joined in a fifth stage of mating.
Figure 20:
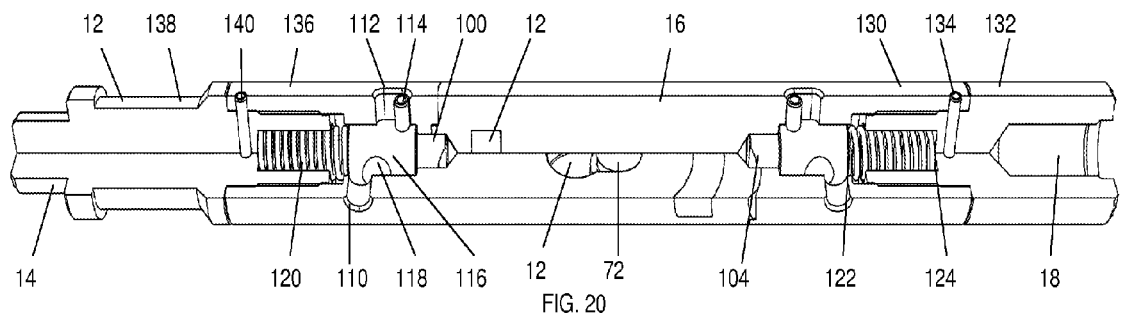
FIG. 20 is a side perspective with a cut-away quarter section of the first and second parts of FIG. 17 joined in the final stage of mating to form the connector of FIG. 1.

FIG. 19 shows a fifth stage of mating where further rotation causes the end surface 24 to abut wall 74, end surface 38 to abut wall 76, end surface 64 to abut wall 34 and end surface 78 to abut wall 76. The radii of curvature of walls 24 and 64 are the same as the radii of curvature of surfaces 74 and 64. The radii of curvature of walls 38 and 78 are the same as the radii of curvature of surfaces 76 and 36. This also allows transfer of forces between the parts 12 and 16. The undercut formed with wall 34 receives the jutting end with wall 64 and the undercut formed with wall 74 receives the jutting end with wall 24. When the undercuts receive the jutting ends this assists the key and keyway retaining contact between surfaces 26 and 66.

The engagement of the ends occurs at about an angle of 160 degrees between the parts 12 and 16, however this can occur at a different angle. In one preferred form this angle is between 150 and 170 degrees.

Rotation continues until the sixth and final stage of mating, where the parts 12 and 16 are at 180 degrees to each other and in alignment as shown in FIGS. 1 and 2. The part 16 is thus in an engaged position. As this occurs the angled sides of heads 100 and 104 are forced back into the bodies 20 and 60 respectively until the heads 100 and 104 align with notches 102 and 106, at which point the spring loading of the pins 116 and 116' force head 100 into notch 102 and head 104 into notch 106, thereby locking the parts 12 and 16 in position. Alternatively pins can be removed from holes 110 to allow the heads 100 and 104 to spring into the notches 102 and 106. This prevents the parts 12 and 16 from inadvertently rotating out of alignment. However if desired a pin can be inserted into each of tubes 114 and 114' and they are moved apart to withdraw the heads 100 and 104 from the notches 102 and 106 to allow rotation.

The parts 12 and 16 can be separated by unlocking the pins 116 and 116', rotating the parts 12 and 16 back to being generally perpendicular, the key 68 moved within the channel 32 to be in the opening 28 and the head 72 removed from the opening 28. The parts 12 and 16 can then be separated.

In an embodiment the body 20 comprises of a hollow cylindrical portion 136 threadingly engaged with a solid cylindrical portion 138 having a narrow 'fish neck' portion and a collar portion before the threaded end 14. A pin or screw 140 can lock the hollow portion 136 to the solid portion 138. The fish neck portion is useful in a down hole environment in case the connector needs to be retrieved with a 'fishing tool'.

The body 60 may comprise a similar structure with a hollow cylindrical portion 136' threadingly engaged with a cylindrical portion 138' which includes the tube with the threaded hole 18. A pin or screw 140 can lock the hollow portion 136' to the cylindrical portion 138'.

The method of operation and use of the connector of the present invention will now be described by way of example.

In use threaded end 14 will be connected to a lifting means. The threaded hole 18 will be connected to a component to be lifted, such as a down hole tool. Whist each end is connected to the respective other components, the coupling parts 12 and 16 are brought into perpendicular arrangement as shown in FIG. 8. The surfaces 26 and 66 are brought into contact and the key 68 is inserted into the keyway 38 as shown in FIG. 10. The key 68 is then slid within the channel 32 so that the key reaches the end of the channel 32. The axes of rotation of the parts 12 and 16 are thus aligned and the part 12 is in the rotation position.

The part 16 is then rotated to the engaged position. This may be for example by lifting the part 12 allowing gravity to pull the part 16 so as to rotate it. Tongue 80 engages groove 42, then tongue 40 engages groove 82 so that the key 68 can not jump put of the keyway 28. Then end wall 24 and wall 38 engage surfaces 74 and 76 respectively and end wall 64 and wall 78 engage surfaces 34 and 36 respectively. Finally the parts 12 and 16 will be in alignment and the heads 100 and 104 of the pins 116 and 116' will engage the notches 102 and 106.

The undercuts and jutting ends, surfaces 20 and 60, pins 116 and 116', and key 68 and channel 32 will transfer torque from one part to the other. Bending perpendicular to the surfaces 26 and 66 will be transferred and resisted by the undercuts, pins 116 and 116' and key 68 and channel 32. Bending in the plane of surfaces 26 and 66 will be transferred and resisted by the pins 116 and 116'. Thrust (including compression and tension) will be transferred by the respective abutting load transference walls and surfaces, depending on the direction of thrust.

To separate the parts 12 and 16, the pins 116 and 116' must first be released. This allows rotation of the parts relative to each other until they are generally perpendicular. When the part 12 is vertical, rotation of part 16 will be against gravity. Next part 16 will need to slide relative to part 12 such that the key 68 traverses the keyway 28 and can then be removed from the keyway 28, thereby separating the parts. Again when the part 12 is vertical, upward sliding of part 16 will be against gravity.

Modifications may be made to the present invention with the context of that described and shown in the drawings. Such modifications are intended to form part of the invention described in this specification.

The invention claimed is:

1. A connector comprising:
   a first coupling part having a flat surface with a shaft projecting therefrom;
   a second coupling part having a corresponding flat surface and a hole, such that the flat surfaces may be in abutment when the shaft is inserted into the hole and the first coupling part is positioned transverse to the second coupling part;
   wherein the first coupling part is movable relative to the second coupling part by sliding from a first position in which the shaft is inserted into the hole to a rotation position in which the coupling parts are held so as to be inseparable by the shaft being captured inside the hole;
   wherein the first coupling part is rotatable relative to the second coupling part about the shaft when the first coupling part is in the position in which the coupling parts are held so as to be inseparable;
   wherein the first coupling part and the second coupling part are provided with load transference surfaces arranged to transfer load forces between the coupling members when the first coupling part is rotated relative to the second coupling part to an engaged position; and
   wherein the load transference surfaces comprise at least one curved tongue on one of the first and second coupling parts and at least one corresponding curved groove on the other of the first and second coupling parts.

2. A connector according to claim 1, wherein the first coupling part is slidable within the hole when the shaft is inserted in the hole.

3. A connector according to claim 1, wherein rotation of the first coupling part relative to the second coupling part to the engaged position is not possible unless the first coupling part has moved to the rotation position.

4. A connector according to claim 1, wherein the first coupling part and the second coupling part are provided with a plurality of load transference surfaces on either side of the shaft and hole respectively arranged to transfer load forces between the coupling members.

5. A connector according to claim 4, wherein each of the plurality of load transference surfaces come into engagement separately as the first coupling part is rotated relative to the second coupling part.

6. A connector according to claim 1, wherein the connector comprises a locking means for locking the coupling parts in the engaged position.

7. A connector comprising:
   a first coupling part having a first abutment surface, a key with a flanged head projecting from the first abutment surface and a first load transference surface on the first abutment surface spaced from the key;
   a second coupling part having a second abutment surface for abutting the first abutment surface, a keyway in the second abutment surface for receiving the flanged head of the key when the first coupling part is transverse the second coupling part and a slot with a smaller opening than the keyway in one dimension extending from the keyway into which the received flanged head can move to a rotation position by sliding within the slot whilst capturing the flanged head inside the slot, and a second load transference surface spaced from the rotation position by the same distance as the first abutment surface is spaced from the key;
   wherein the rotation position is spaced from a position at which the key is received in the keyway;
   wherein the abutment faces are prevented from separating and first coupling member is rotatable to an engagement position when the abutment faces are abutted, the key is inserted into the keyway and the key is moved to the rotation position;
   wherein the load transference surfaces are arranged to transfer a force between the coupling parts when the first coupling part is rotated relative to the second coupling part to the engagement position such that the load transference surfaces are in abutment.

8. A connector according to claim 7, wherein the keyway extends into a semi-circular cross-sectional portion of the second coupling part and the keyway forms a pocket into which the key may move and when so positioned the abutment faces are prevented from separating.

9. A connector according to claim 8, wherein the pocket is elongate and runs axially relative to the second coupling part.

10. A connector according to claim 7, wherein the rotation position and the central axis of the key are aligned when the key is moved to the rotation position.

11. A connector according to claim 7, wherein the rotation position is spaced form the central axis of the key when the key is inserted into the keyway without moving the key to the rotation position.

12. A connector according to claim 7, wherein one or both of the load transference surfaces of the first coupling part and the second coupling part are provided on formations which are positioned to prevent rotation of the first coupling part relative the second coupling part to the engaged position unless the first coupling part has been slidably moved to the rotation position.

13. A connector according to claim 7, wherein the first coupling part comprises a locking means for locking the second part in the engagement position.

14. A connector according to claim 7, wherein the second coupling part comprises a locking means for locking the second part in the engagement position relative to the first coupling part.

15. A connector according to claim 7, wherein the load transference surfaces are configured to commence engagement upon a small rotation of the first coupling part relative to the second coupling part and prior to the parts being aligned.

16. A connector according to claim 7, wherein the load transference surfaces are configured to prevent return movement of the first coupling part relative to the second coupling part to a position in which the coupling parts are separable when the load transference surfaces are engaged.

17. A connector according to claim 7, wherein the load transference surfaces are configured to progressively engage with rotation of the first coupling part relative to the second coupling part.

18. A connector comprising:
   a first coupling part having a flat surface;
   a second coupling part having corresponding flat surface such that the flat surfaces may be in abutment;
   characterised in that
   the first coupling part comprises a shaft projecting from the flat surface;
   the second coupling part comprises a hole in the corresponding flat surface, such that the shaft is able to be inserted into the hole when the flat surfaces are in abutment and the first coupling part is positioned transverse to the second coupling part;
   wherein the first coupling part is movable relative to the second coupling part by sliding from a position in which the shaft is inserted into the hole to a position in which the coupling parts are held so as to be inseparable by the shaft being captured inside the hole;

wherein the first coupling part is rotatable relative to the second coupling part about the shaft when the first coupling part is in the position at which the coupling parts are inseparable;

wherein the first coupling part and the second coupling part are provided with load transference surfaces arranged to transfer loading between the coupling members when the first coupling part is rotated relative to the second coupling part to an engaged position; and wherein the load transference surfaces comprise at least one curved tongue on one of the first and second coupling parts and at least one corresponding curved groove on the other of the first and second coupling parts.

19. A down hole tool comprising a connector as defined by claim 1.

20. A method of forming a connection between a first component and a second component, said method comprising:

coupling a first coupling part of a connector to the first component;

coupling a second coupling part of the connector to the second component;

positioning the first coupling part transverse to the second coupling part;

inserting a shaft projecting from a flat surface of the first part into a hole in a complementary flat surface of the second part so that the flat surfaces are in abutment;

slidably moving the first coupling part relative to the second coupling part so that the coupling parts are inseparable;

rotating the first coupling part relative to the second coupling part such that the parts are aligned and such that load transference surfaces of each part are engaged to transfer loading between the coupling members, wherein the load transference surfaces comprise at least one curved tongue on one of the first and second coupling parts and at least one corresponding curved groove on the other of the first and second coupling parts.

21. A method according to claim 20, wherein moving the first coupling part relative to the second coupling part so that the coupling parts are inseparable comprises sliding the shaft of the first part into a restricted opening channel extending from the hole such that the shaft may not be directly withdrawn.

22. A method according to claim 20, wherein moving the first coupling part relative to the second coupling part so that the coupling parts are inseparable comprises moving the first coupling part relative to the second coupling part so that the first coupling part is rotatable relative to the second coupling part.

23. A method according to claim 20, wherein engagement of the load transference surfaces prevents return movement of the first coupling part relative to the second coupling part to a position in which the coupling parts are separable.

24. A method according to claim 20, wherein disengagement of the first coupling part and the second coupling part comprises rotating the first coupling part relative to the second coupling part to the rotation position such that the load transference surfaces disengage, moving the first coupling part relative to the second coupling part to a position in which the coupling parts are separable, and removing the shaft from the hole so as to decouple the parts.

25. A downhole tool comprising a connector, the connector comprising:

a first coupling part having a flat surface with a shaft projecting therefrom;

a second coupling part having a corresponding flat surface and a hole, such that the flat surfaces may be in abutment when the shaft is inserted into the hole and the first coupling part is positioned transverse to the second coupling part;

wherein the first coupling part is movable relative to the second coupling part by sliding from a first position in which the shaft is inserted into the hole to a rotation position in which the coupling parts are held so as to be inseparable by the shaft being captured inside the hole;

wherein the first coupling part is rotatable relative to the second coupling part about the shaft when the first coupling part is in the position in which the coupling parts are held so as to be inseparable;

wherein the first coupling part and the second coupling part are provided with load transference surfaces arranged to transfer load forces between the coupling members when the first coupling part is rotated relative to the second coupling part to an engaged position.

26. A downhole tool according to claim 25, wherein rotation of the first coupling part relative to the second coupling part to the engaged position is not possible unless the first coupling part has moved to the rotation position.

27. A downhole tool according to claim 25, wherein the first coupling part and the second coupling part are provided with a plurality of load transference surfaces on either side of the shaft and hole respectively arranged to transfer load forces between the coupling members.

28. A downhole tool according to claim 25, wherein the connector comprises a locking means for locking the coupling parts in the engaged position.

29. A method of forming a connection between a first component and a second component, said method comprising:

coupling a first coupling part of a connector to the first component;

coupling a second coupling part of the connector to the second component;

positioning the first coupling part transverse to the second coupling part;

inserting a shaft projecting from a flat surface of the first part into a hole in a complementary flat surface of the second part so that the flat surfaces are in abutment;

slidably moving the first coupling part relative to the second coupling part so that the coupling parts are inseparable;

rotating the first coupling part relative to the second coupling part such that the parts are aligned and such that load transference surfaces of each part are engaged to transfer loading between the coupling members, wherein engagement of the load transference surfaces prevents return movement of the first coupling part relative to the second coupling part to a position in which the coupling parts are separable.

30. A method according to claim 29, wherein disengagement of the first coupling part and the second coupling part comprises rotating the first coupling part relative to the second coupling part to the rotation position such that the load transference surfaces disengage, moving the first coupling part relative to the second coupling part to a position in which the coupling parts are separable, and removing the shaft from the hole so as to decouple the parts.

\* \* \* \* \*